US010700798B1

(12) United States Patent
Elnajjar et al.

(10) Patent No.: US 10,700,798 B1
(45) Date of Patent: Jun. 30, 2020

(54) SYSTEM AND METHOD TO RECEIVE AND DELIVER AUDIO CONTENT

(71) Applicant: GM GLOBAL TECHNOLOGY OPERATIONS LLC, Detroit, MI (US)

(72) Inventors: Hassan A. Elnajjar, Dearborn, MI (US); Steve P. Schwinke, Plymouth, MI (US); Krishna Soumya Panditha, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/289,880

(22) Filed: Mar. 1, 2019

(51) Int. Cl.
*H04N 7/10* (2006.01)
*H04H 60/06* (2008.01)
*H04N 21/81* (2011.01)
*G06Q 30/02* (2012.01)

(52) U.S. Cl.
CPC ......... *H04H 60/06* (2013.01); *G06Q 30/0269* (2013.01); *H04N 21/812* (2013.01)

(58) Field of Classification Search
CPC .................................................. H04N 21/812
USPC .......................................................... 725/32
See application file for complete search history.

(56) References Cited

U.S. PATENT DOCUMENTS

| | | | | |
|---|---|---|---|---|
| 7,808,008 B2* | 10/2010 | Miyake | ................. | G09G 3/325 257/290 |
| 8,532,607 B2* | 9/2013 | Sennett | .................. | H04W 4/90 455/404.1 |
| 8,572,645 B2* | 10/2013 | Kim | ..................... | G08B 27/005 725/32 |
| 10,496,252 B2* | 12/2019 | Ren | ....................... | G01C 21/367 |
| 2004/0268387 A1* | 12/2004 | Wendling | ............ | H04N 5/4401 725/35 |
| 2007/0047520 A1* | 3/2007 | Byers | ................ | H04M 3/42357 370/352 |
| 2008/0092159 A1* | 4/2008 | Dmitriev | ............ | G06Q 30/0269 725/34 |
| 2009/0019471 A1* | 1/2009 | Rabinovitch | .... | H04N 21/23424 725/34 |
| 2010/0299687 A1* | 11/2010 | Bertino-Clarke | ........................... | G06Q 30/0241 725/5 |
| 2011/0088058 A1* | 4/2011 | Velazquez | .............. | H04H 20/59 725/33 |
| 2012/0324505 A1* | 12/2012 | Casagrande | ............. | H04N 5/04 725/32 |
| 2014/0289788 A1* | 9/2014 | Evans | .................. | H04H 20/106 725/116 |
| 2017/0054204 A1* | 2/2017 | Changalvala | ........ | H01Q 1/3291 |
| 2017/0201761 A1* | 7/2017 | Walker | ................... | H04N 19/46 |
| 2017/0371608 A1* | 12/2017 | Wasserman | ............... | G06F 3/14 |
| 2018/0192090 A1* | 7/2018 | Shen | .................. | H04N 21/2343 |

* cited by examiner

*Primary Examiner* — Michael B. Pierorazio (57) ABSTRACT

One general aspect includes a method to receive and deliver media content during a designated time slot, the method including: receiving, via a processor, a first type of media content over a first wireless communication channel; detecting, via the processor, the designated time slot in the first type of media content; receiving, via the processor, a second type of media content over a second wireless communication channel when in proximity of a device configured to wirelessly provide media content; and delivering during the designated time slot, via the processor, the second type of media content to a user.

20 Claims, 3 Drawing Sheets

SYSTEM AND METHOD TO RECEIVE AND DELIVER AUDIO CONTENT

INTRODUCTION

Radio advertisements are the result of a business or service provider paying a commercial radio station to air their advertisement at some designated time period occurring between songs or during a telecasted event. This advertising time can in particular be apportioned into multiple time slots to allow the advertisements to be prioritized in some way. For example, nationally syndicated advertisements could be delivered during the first half of this allocated advertising time; whereas, local advertisements could be delivered sometime in its second half. That said, in the little time they have, these local advertisements often do not reach their intended demographic. In many instances, this is because the local advertisements are received by listeners located too far away from the business/service provider to want to become customers. However, if these listeners were exposed to advertisements produced by similar businesses/service providers much closer in proximity they would desire to become customers. It is therefore desirable to provide a system and method that enables businesses and service providers to advertise to nearby radio listeners during the few available time slots allocated by radio stations. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method to receive and deliver media content during a designated time slot, the method including: receiving, via a processor, a first type of media content over a first wireless communication channel; detecting, via the processor, the designated time slot in the first type of media content; receiving, via the processor, a second type of media content over a second wireless communication channel when in proximity of a device configured to wirelessly provide media content; and delivering during the designated time slot, via the processor, the second type of media content to a user. Other embodiments of this aspect include corresponding computer systems, apparatus, and computer programs recorded on one or more computer storage devices, each configured to perform the actions of the methods.

Implementations may include one or more of the following features. The method further including the step of modifying, via the processor, the second type of media content to conform to one or more parameters of the designated time slot. The method further including the step of notifying, via the processor, a remote facility that the second type of media content has been delivered. The method further including the step of filtering, via the processor, the second type of media content that can be received based on one or more user preferences, user feedback, vehicle location, direction of vehicle travel, or some combination thereof. The method where the processor receives a plurality of versions of the second type of media content over the second wireless communication channel. The method where: the first wireless communication channel is an amplitude modulated (AM) radio channel, frequency modulated (FM) radio channel, Real-time Streaming Protocol (RTSP) radio channel, or satellite radio channel; and the second wireless communication channel is a vehicle-to-everything (V2X) communications channel. The method where the first and second type of media content one or more audio and/or visual advertisements. Implementations of the described techniques may include hardware, a method or process, or computer software on a computer-accessible medium.

One general aspect includes a system to receive and deliver media content during a designated time slot, the system including: a memory configured to include one or more executable instructions and a processor configured to execute the executable instructions, where the executable instructions enable the processor to carry out the steps of: receiving a first type of media content over a first wireless communication channel; detecting the designated time slot in the first type of media content; receiving a second type of media content over a second wireless communication channel when in proximity of a device configured to wirelessly provide media content; and delivering, during the designated time slot, the second type of media content to a user. Other embodiments of this aspect include corresponding computer systems, apparatus, and computer programs recorded on one or more computer storage devices, each configured to perform the actions of the methods.

Implementations may include one or more of the following features. The system where the executable instructions enable the processor to carryout the additional step of modifying the second type of media content to conform to one or more parameters of the designated time slot. The system where the executable instructions enable the processor to carryout the additional step of notifying a remote facility that the second type of media content has been delivered. The system where the executable instructions enable the processor to carryout the additional step of filtering the second type of media content that can be received based on one or more user preferences, user feedback, vehicle location, direction of vehicle travel, or some combination thereof. The system where the processor receives a plurality of versions of the second type of media content over the second wireless communication channel. The system where: the first wireless communication channel is an amplitude modulated (AM) radio channel, frequency modulated (FM) radio channel, Real-time Streaming Protocol (RTSP) radio channel, or satellite radio channel; and the second wireless communication channel is a vehicle-to-everything (V2X) communications channel. The system where the first and second type of media content one or more audio and/or visual advertisements. Implementations of the described techniques may include hardware, a method or process, or computer software on a computer-accessible medium.

One general aspect includes a non-transitory and machine-readable medium having stored thereon executable instructions adapted to receive and deliver media content during a designated time slot, which when provided to a processor and executed thereby, causes the processor to carry out the following steps: receiving a first type of media content over a first wireless communication channel; detecting the designated time slot in the first type of media content;

receiving a second type of media content over a second wireless communication channel when in proximity of a device configured to wirelessly provide media content; and delivering, during the designated time slot, the second type of media content as sound through an audio system and/or visually through a display. Other embodiments of this aspect include corresponding computer systems, apparatus, and computer programs recorded on one or more computer storage devices, each configured to perform the actions of the methods.

Implementations may include one or more of the following features. The non-transitory and machine-readable memory where the executable instructions enable the processor to carryout an additional step of modifying the second type of media content to conform to one or more parameters of the designated time slot. The non-transitory and machine-readable memory where the executable instructions enable the processor to carryout an additional step of notifying a remote facility that the second type of media content has been delivered. The non-transitory and machine-readable memory where the executable instructions enable the processor to carryout an additional step of filtering the second type of media content that can be received based on one or more user preferences, user feedback, vehicle location, direction of vehicle travel, or some combination thereof. The non-transitory and machine-readable memory where the processor receives a plurality of versions of the second type of media content over the second wireless communication channel. The non-transitory and machine-readable memory where: the first wireless communication channel is an amplitude modulated (AM) radio channel, frequency modulated (FM) radio channel, Real-time Streaming Protocol (RTSP) radio channel, or satellite radio channel; and the second wireless communication channel is a vehicle-to-everything (V2X) communications channel. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
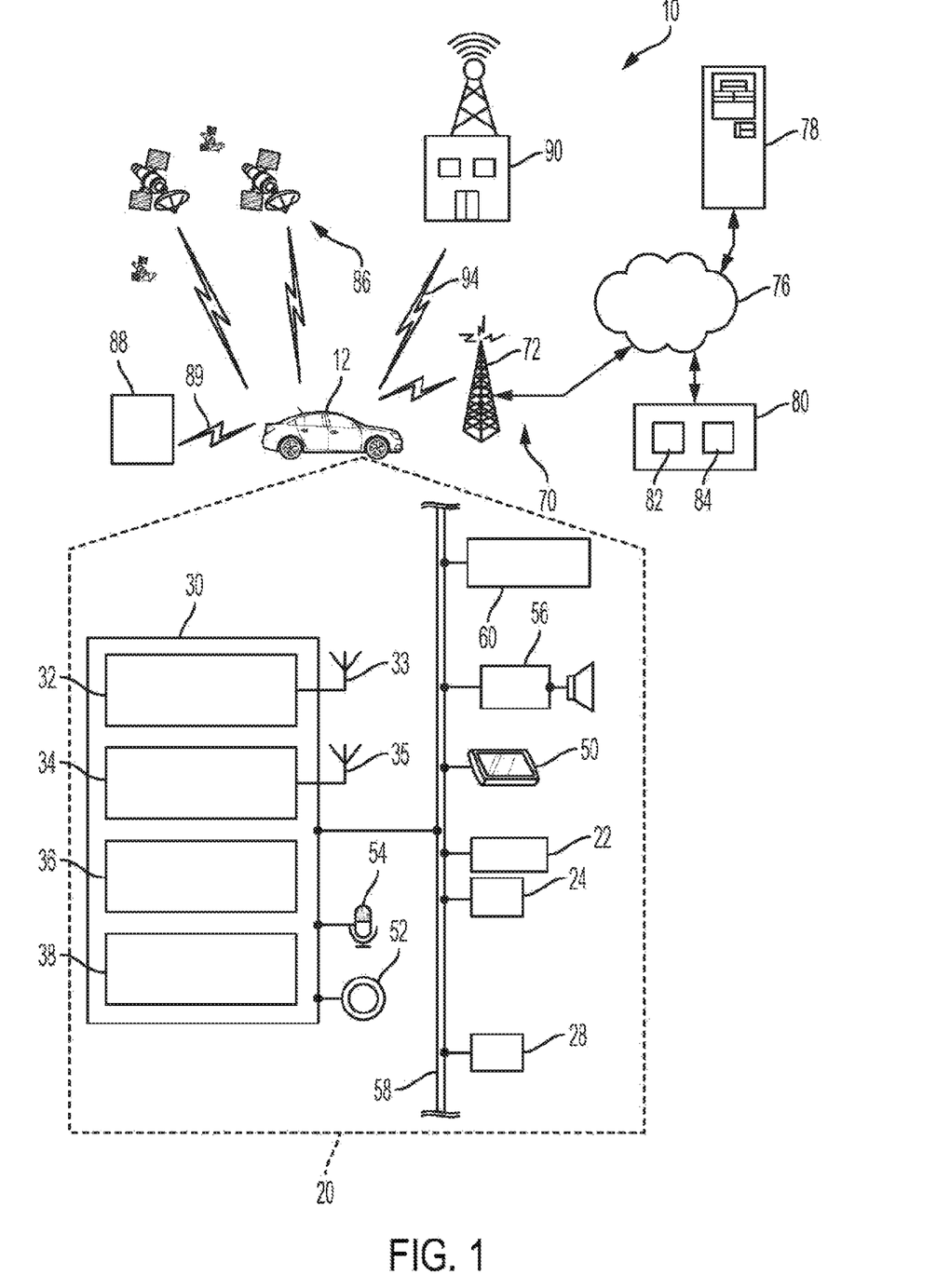
FIG. 1 is a block diagram depicting an exemplary embodiment of system capable of utilizing the system and method disclosed herein.

With reference to FIG. 1, there is shown an operating environment that comprises a communications system 10 and that can be used to implement the method disclosed herein. Communications system 10 generally includes a vehicle 12 that includes vehicle electronics 20, one or more wireless carrier systems 70, a land communications network 76, a computer or server 78, a vehicle backend services facility 80, and a constellation of global navigation satellite system (GNSS) satellites 86. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. In certain embodiments, vehicle 12 may include a power train system with multiple generally known torque-generating devices including, for example, an engine. The engine may be an internal combustion engine that uses one or more cylinders to combust fuel, such as gasoline, in order to propel vehicle 12. The power train system may alternatively include numerous electric motors or traction motors that convert electrical energy into mechanical energy for propulsion of vehicle 12.

Some of the vehicle electronics 20 are shown generally, in FIG. 1 and includes a global navigation satellite system (GNSS) receiver 22, a body control module or unit (BCM) 24, and other vehicle system modules (VSMs) 28, a telematics unit 30, vehicle-user interfaces 50-56, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the telematics unit 30, for example.

The vehicle 12 can include numerous vehicle system modules (VSMs) as part of vehicle electronics 20, such as the GNSS receiver 22, BCM 24, telematics unit 30 (vehicle communications system), vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is hardwire connected by communications bus 58 to the other VSMs including the telematics unit 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from computer 78 or remote facility 80 via land network 76 and telematics unit 30. As is appreciated by those skilled in the art, the above-mentioned VSMs are only examples of some of the modules that may be used in vehicle 12, as numerous others are also possible. It should also be appreciated that these VSMs can otherwise be known as electronic control units, or ECUs.

Global navigation satellite system (GNSS) receiver 22 receives radio signals from a constellation of GNSS satellites 86. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 86. And, in another example, GNSS receiver 22 can be a BDS receiver that receives a plurality of GNSS (or BDS) signals from a constellation of GNSS (or BDS) satellites 86. The GNSS received can determine a current vehicle location based on reception of a plurality of GNSS signals from the constellation of GNSS satellites 86. The vehicle location information can then be communicated to the telematics unit 30, or other VSMs, such as the onboard computer 60. In one embodiment (as shown in FIG. 1), the wireless communications module and/or a telematics unit 30 can be integrated with the GNSS receiver 22 so that, for example, the GNSS receiver 22 and the telematics unit 30 (or the wireless communications device) are directly connected to one another as opposed to being connected via communications bus 58. In other embodiments, the GNSS receiver 22 is a separate, standalone module or there may be a GNSS receiver 22 integrated into the telematics unit 30 in addition to a separate, standalone GNSS receiver connected to telematics unit 30 via communications bus 58.

Body control module (BCM) 24 can be used to control various VSMs 28 of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with telematics unit 30 or the onboard computer 60. Or, the BCM may be a separate device that is connected to other VSMs via bus 58. The BCM 24 can include a processor and/or memory, which can be similar to processor 36 and memory 38 of telematics unit 30, as discussed below. The BCM 24 may communicate with telematics unit 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, power windows 11, power sun/moon roof, the vehicle's head lamps 98, the horn system 99, air conditioning operations, power mirrors, controlling the vehicle primary mover (e.g., engine, primary propulsion system), and/or controlling various other vehicle modules. In one embodiment, the BCM 24 can be used (at least in part) to detect a vehicle event, such as a power on state or a power off state or when the vehicle's air conditioning operations are turned ON or OFF (i.e., cooled air is being blown or is stopped being blown from the vents of the vehicle's Heating Ventilation and Air Conditioning (HVAC) system), based on one or more onboard vehicle sensor readings, as discussed more below.

Telematics unit 30 is capable of communicating data via SRWC through use of SRWC circuit 32 and/or via cellular network communications through use of a cellular chipset 34, as depicted in the illustrated embodiment. The telematics unit 30 can provide an interface between various VSMs of the vehicle 12 and one or more devices external to the vehicle 12, such as one or more networks or systems at remote facility 80. This enables the vehicle to communicate data or information with remote systems, such as remote facility 80.

In at least one embodiment, the telematics unit 30 can also function as a central vehicle computer that can be used to carry out various vehicle tasks. In such embodiments, the telematics unit 30 can be integrated with the onboard computer 60 such that the onboard computer 60 and the telematics unit 30 are a single module. Or, the telematics unit 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the telematics unit 30 is a standalone module, and can be implemented as an OEM-installed (embedded) or aftermarket device that is installed in the vehicle.

In the illustrated embodiment, telematics unit 30 includes, the SRWC circuit 32, the cellular chipset 34, a processor 36, memory 38, SRWC antenna 33, and antenna 35. The telematics unit 30 can be configured to communicate wirelessly according to one or more SRWC protocols such as any of the Wi-Fi™, WiMAX™, Wi-Fi™ Direct, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the telematics unit 30 can be configured to communicate using IEEE 802.11p such that the vehicle can carry out Vehicle-to-everything (V2X) communications such as, for example, vehicle-to-vehicle (V2V) communications, or vehicle-to-infrastructure (V2I) communications with infrastructure systems or devices, such as the remote facility 80. And, in other embodiments, other protocols can be used for V2X communications (e.g., C-V2X in 3GPP).

The SRWC circuitry 32 enables the telematics unit 30 to transmit and receive SRWC signals, such as BLE signals. The SRWC circuit can allow the telematics unit 30 to connect to another SRWC device. Additionally, in some embodiments, the telematics unit 30 contains a cellular chipset 34 thereby allowing the device to communicate via one or more cellular protocols, such as those used by cellular carrier system 70, through antenna 35. In such a case, the telematics unit 30 is user equipment (UE) that can be used to in carry out cellular communications via cellular carrier system 70.

Antenna 35 is used for communications and is generally known to be located throughout vehicle 12 at one or more locations external to the telematics unit 30. Using antenna 35, telematics unit 30 may enable the vehicle 12 to be in communication with one or more local or remote networks (e.g., one or more networks at remote facility 80 or computers 78) via packet-switched data communication. This packet switched data communication may be carried out through use of a non-vehicle wireless access point or cellular system that is connected to a land network via a router or modem. When used for packet-switched data communication such as TCP/IP, the telematics unit 30 can be configured with a static Internet Protocol (IP) address or can be set up to automatically receive an assigned IP address from another device on the network such as a router or from a network address server.

Packet-switched data communications may also be carried out via use of a cellular network that may be accessible by the telematics unit 30. Telematics unit 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 36 executes various types of digitally-stored instructions, such as software or firmware programs stored in memory 38, which enable the telematics unit 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the telematics unit 30 also includes a modem for communicating information over the communications bus 58.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the telematics communications device 30 to provide other data, response, and/or control input. Audio system 56 provides audio output to a vehicle occupant and can be a dedicated, stand-alone system or part of the primary vehicle audio system. As such, audio system 56 receives analog information, rendering and delivering it as sound, via the entertainment bus. According to one embodiment, audio system 56 is operatively coupled to both vehicle bus 58 and an entertainment bus (not shown) and can provide amplitude modulated (AM) radio, frequency modulated (FM) radio, Real-time Streaming Protocol (RTSP) radio (IP streaming audio—such as, for example, Pandora Radio, Spotify, Amazon Music, etc.), satellite radio, CD, DVD, and other multimedia functionality. Audio component 64 may contain a speaker system, or may utilize a speaker via arbitration on communications bus 58. This functionality can be provided in conjunction with or independent of an infotainment module.

Microphone 54 provides audio input to the telematics unit 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, a video projector that projects images onto the windshield from the vehicle cabin ceiling, or some other display. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components that may be needed to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof The computers 78 (only one shown) can be used for one or more purposes, such as for providing backend vehicle services to a plurality of vehicles (such as vehicle 12) and/or for providing other vehicle-related services. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving data communicated from the vehicle, as well as setting up and/or configuring subscriber preferences or controlling vehicle functions; or a vehicle telemetry data server that receives and stores data from a plurality of vehicles.

Vehicle backend services facility 80 is a remote facility, meaning that it is located at a physical location that is located remotely from the vehicle 12. The vehicle backend services facility 80 (or "remote facility 80" for short) may be designed to provide the vehicle electronics 20 with a number of different system back-end functions through use of one or more electronic servers 82 or live advisors. The vehicle backend services facility 80 includes vehicle backend services servers 82 and databases 84, which may be stored on a plurality of memory devices. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases 84 at the remote facility 80 can store various information and can include a vehicle operation database that stores information regarding the operation of various vehicles (e.g., vehicle telemetry or sensor data).

Advertisement server 88 is a computer system that includes a processing device, media content stored in a database, and a V2X enhanced transceiver. As follows, when in a wireless range, ad server 88 can transmit stored media content over to vehicle 12 via a V2X communications channel 89 (e.g., 802.11p (DSRC), 3GPP (C-V2X), etc.), as discussed above. This transmission may occur after vehicle 12, acting as a beacon, pings the ad server 88 with its current location. Otherwise, ad server 88 may act as the beacon to transmit its stored media content out at set time intervals for receipt by a wide audience that includes any vehicles 12 within range of the V2X communications channel. Moreover, ad server 88 may be installed onto various kinds of infrastructure such as, for example, restaurants, billboards, cell towers, apartment buildings, and traffic lights and signs. Skilled artists will see that wireless transactions between vehicle 12 and V2X enhanced infrastructure are well known in the art.

Radio station 90 is a commercial entity that broadcasts media content (e.g., songs, advertisements, sporting events, etc.) via radio waves intended to reach a wide audience (i.e., a radio channel). Station 90 can be linked to others similar entities via radio networks to broadcast a common radio format (e.g., broadcast syndication, simulcast, or the like). Radio station 90 can also allot time slots to the exclusive broadcast of advertisements. Moreover, these time slots can be bunched together to allow for multiple advertisements to be broadcast over a certain period of time (e.g., 3-4 minutes) and the time slots can be prioritized based on whether the media advertising is in national syndication/simulcast or if the advertisement is to be broadcast to local or regional based audiences.

METHOD

The method or parts thereof can be implemented in a computer program product (e.g., processor 36) embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 2:
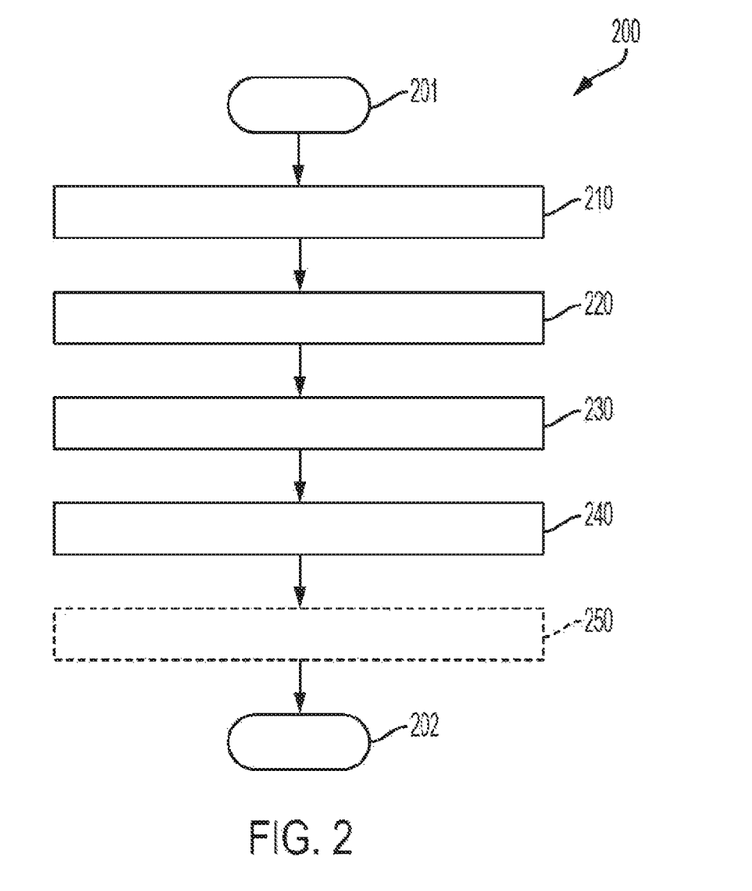
FIG. 2 is a flowchart of an exemplary process to receive and deliver media content.

Turning now to FIG. 2, there is shown an embodiment of a method 200 to receive and deliver media content during a designated time slot. One or more aspects of the media content delivery method 200 may be completed through telematics unit 30 which may include one or more executable instructions incorporated into memory device 38 and carried out by electronic processing device 36. One or more ancillary aspects of method 200 may also be completed by ad server 88, display 50, audio system 56, remote facility 80 (e.g., via server 82), or computers 78. Skilled artisans will moreover see that telematics unit 30, remote facility 80, and ad server 88 may be remotely located from each other.

Method 200 is supported by telematics unit 30 being configured to communicate with remote facility 80 and ad server 88. This configuration may be made by a vehicle manufacturer at or around the time of the telematics unit's assembly or after-market (e.g., via vehicle download using the afore-described communication system 10 or at a time of vehicle service, just to name a couple of examples). Method 200 is supported by telematics unit 30 being able to receive information over a radio channel 94 (e.g., AM, FM, satellite radio, etc.) as well as telematics unit 30 being able to receive information over a V2X communications channel 89 as well as telematics unit 30 being able to deliver media content as sound through audio system 56. These configurations may be made by a vehicle manufacturer at or around the time of the vehicle's assembly or after-market (e.g., via vehicle download to telematics unit 30 using the afore-described communication system 10 or at a time of vehicle service, just to name a couple of examples). Method 200 is further supported by preconfiguring remote facility 80 to receive and store information transmitted from telematics unit 30 and preconfiguring ad server 88 to store and transmit media content. Skilled artists will see that media content is information directed towards an end-user or audience such as, for example, audio books, advertisements, music (e.g., songs), telecasted political events (e.g., speeches, protests, rallies), talk radio, telecasted sporting events, and podcasts.

Figure 3:
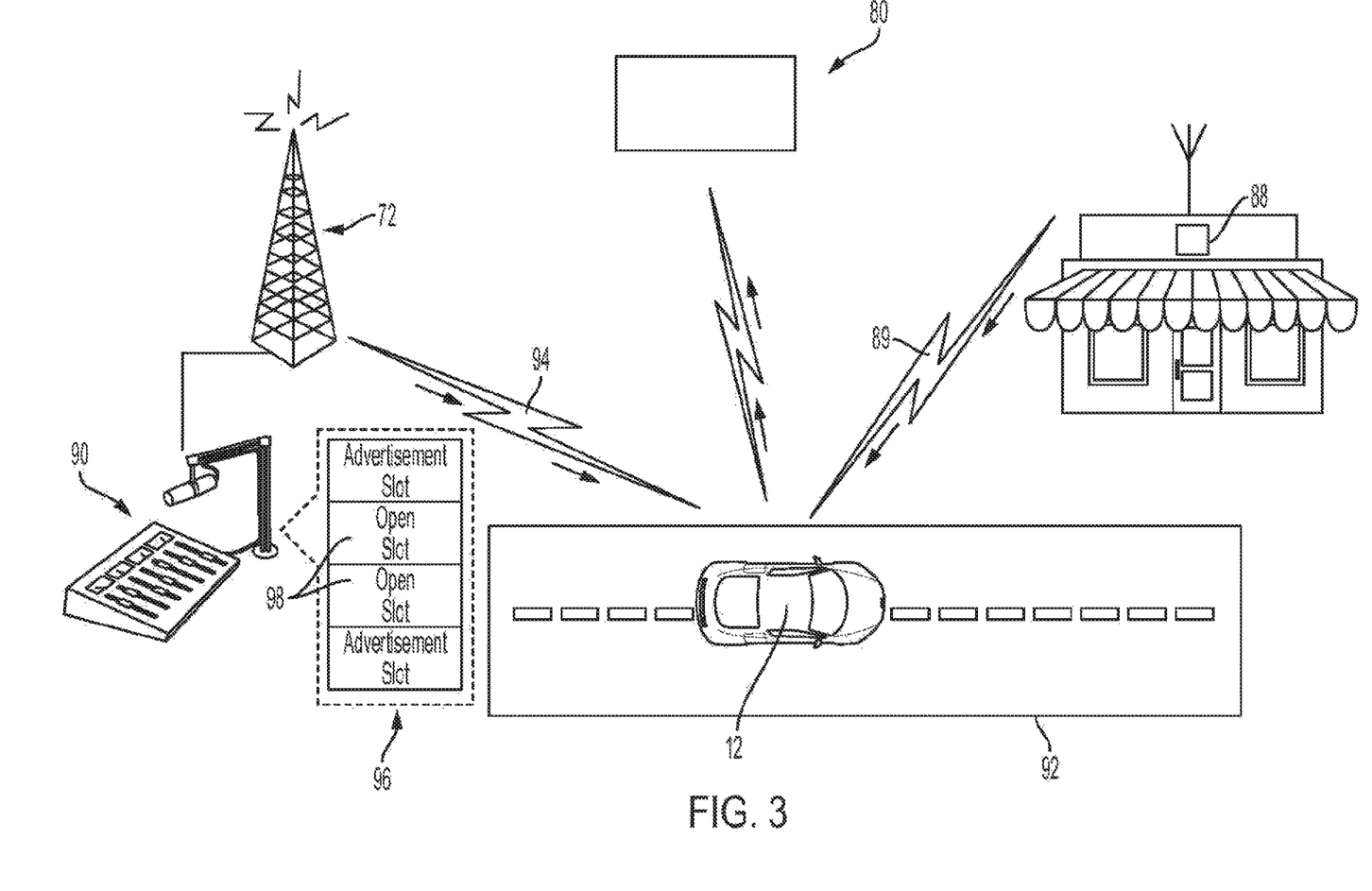
FIG. 3. depicts an exemplary aspect of the process of FIG. 2 in accordance with one or more exemplary embodiments.

With additional reference to FIG. 3, method 200 begins at 201 in which vehicle 12 is traveling along a road segment 92 and the telematics unit 30 is activated to play media content being broadcast from radio station 90 (which may be via one or more user inputs provided to the infotainment module). In step 210, telematics unit 30 receives a continuous and substantially uninterrupted stream of media content (e.g., audio content such as music) from radio station 90 over a radio communications channel 94 such as, for example, an amplitude modulated (AM) radio channel, frequency modulated (FM) radio channel, Real-time Streaming Protocol (RTSP) radio channel, or satellite radio channel. Moreover, in this step, telematics unit 30 receives a notification from the radio station 90 that an upcoming advertising segment (i.e., a period of time allocated to the broadcasting of commercial advertising media) includes one or more designated time slots 98 (open time slots), which are either currently unallocated or have low priority advertising assigned to time slot. Alternatively, during the advertising time segment 96, telematics unit 30 receives a notification that there are one or more open time slots 98 at some subsequent point during the allotted time segment 96. This upcoming open time slot notification can alternatively be received by remote facility 80, which is in correspondence with radio station 90 (e.g., radio station 90 provides the remote facility 80 with a copy of its programming or server 82 is running software that can detect when there are upcoming open ad time slots in a stream of radio transmitted media content). This notification can, for example, be embedded in the media content transmissions sent by radio station 90.

In step 220, telematics unit 30 will fill the open time slot with advertising media that has been received from ad server 88 via the V2X communication channel 89. Receiving the V2X transmitted ad media can occur in a number of ways. For example, after telematics unit 30 recognizes that there are one or more open time slots 98 during the ad segment 96, telematics unit 30 will enter into a beacon mode and broadcast one or more requests via the V2X channel 89, to be received any ad servers 88 in proximity the vehicle's location (i.e., the telematics unit 30 will attempt to ping any nearby ad servers 88). In response, all ad servers 88 in proximity to the vehicle's location (e.g., a 10-yard radius, 25-yard radius, or 100-yard radius) will reactively transmit advertising media content to telematics unit 30. In another example, while vehicle 12 is traveling along the road segment 92 it may collect advertising media content being broadcast from multiple ad servers 88. As such, these exemplary ad servers 88 will automatically transmit advertisement broadcasts over the V2X channel at set intervals (e.g., 10 times a second), which can be received by any vehicles 12 within a designated proximity (e.g., a 10-yard radius, 25-yard radius, or 100-yard radius). When received by vehicle 12, telematics unit 30 can store the commercial advertisements to memory 38. Telematics unit 30 can also set aside the advertisements to be assigned one or the open time slots that will occur during the continuous and substantially uninterrupted stream of media content.

Telematics unit 30 can also be configured to filter the types of advertisements that are to be received by the telematics unit 30 based on one ore more of the advertisement characteristics. For example, telematics unit 30 may not accept advertisements from ad servers 88 located at some point which is opposite to the vehicle's 12 direction of travel or it may not accept advertisements produced by a business/service provider located in a direction that is opposite the vehicle's direction of travel (which may be part of turn-by-turn directions provided by remote facility 80). Similarly, telematics unit 30 may not accept advertisements from ad servers 88 that are a certain specified distance away from the vehicle's location (e.g., servers over 100 yards away from vehicle 12). Alternatively, telematics unit 30 may not accept advertisements produced by companies/service providers at a certain specified distance away from the vehicle's location (e.g., companies located over 5 miles from vehicle 12). In another example, telematics unit 30 may not accept advertisements that are counter to one or more user preferences (which can, for example, be provided through the infotainment module). As such, if a user does not want to hear commercials discussing a certain topic or produced by certain companies (e.g., cigarette, alcohol, or adult entertainment companies/topics), the user may tell telematics unit 30 to refrain from accepting any advertisements associated with these companies/topics. Similarly, telematics unit 30 may not accept advertisements based on user feedback. For instance, if the user keeps indicating that they dislike hearing commercials discussing a certain topic or produced certain companies, telematics unit 30 could learn to refrain from accepting advertisements of this nature.

In addition, in this step, when more than one commercial is received via V2X or retrieved from memory 38, telematics unit 30 can pick and choose which of the advertisements should be assigned to the upcoming open time slots. For instance, the advertisements may come with an embedded priority designator that assists the telematics unit 30 in knowing which advertisements take precedent over other advertisements and which advertisements should be assigned to the open time slots and which should be discarded. Moreover, if the open time slot already includes a low-priority designated advertisement, telematics unit 30 may determine if the V2X received advertisement is designated to have a higher priority and then replace the advertisement with that higher priority advertisement (otherwise delete or store the V2X received advertisement because it has a lower priority than the advertisement previously assigned to the timeslot by radio station 90). The priority of the advertisement may also be provided by the business/service provider that produced the advertisement (e.g., by paying for the priority designator to be embedded somewhere in the advertisement information).

In step 230, which may be an optional step in certain embodiments of method 200, before the open time slot is filled with the advertising media content, telematics unit 30 will modify the advertisement to properly fit the time parameters of the open time spot. As follows, telematics unit 30 may shave some duration of time off of the advertisement so that it can fit into the time slot (e.g., one or two seconds). This will ensure the advertisement does not run over the time allotted to it and cause some other media content to be cut off or to prevent two types of media content from playing at one time (i.e., simultaneously playing a song and part of the advertisement).

In order to ensure that the advertisement itself is not cut so short that it does not get all the right information out to the audience, ad server 88 may transmit multiple versions of the advertisement over to vehicle 12. For example, ad server 88 may transmit versions of the advertisement that have different time durations (e.g., a 30-second-long version, a 45-second-long version, or a minute-long version). Telematics unit 30 can then pick the version that best fits the timing of the open time slot. Otherwise, telematics unit 30 can pick the version that best fits the time limits of the open time slot and cut any excessive time off that advertisement, which will ensure that minimal time will be removed from the advertisement and substantially all of the necessary information of the advertisement can reach the vehicle operator and any passengers or any other system users.

In step 240, during the designated time slot, telematics unit 30 will deliver the V2X received advertisement to the vehicle operator and any passengers or any other system users. For example, the advertisement may be played as sound through audio system 56. This will allow the user to listen to the advertisement (e.g., when it is played in between songs). Alternatively, it has been envisioned that these time slots can be visual in nature. As such, telematics unit 30 will deliver the V2X received advertisement as an image or video presented on display 50. For example, the advertisement can be exhibited on display 50 while an audio version of media content is being delivered over the audio system 56 (e.g., displaying an ad on the display while a song is being played as sound in the vehicle's cabin).

In optional step 250, after the advertisement content has been properly delivered, for example, by audio system 56 or display 50, telematics unit 30 will notify remote facility 80 that the advertisement was properly delivered and can also let the remote facility 80 know which V2X enhanced ad server 88 delivered the advertisement to vehicle 12 (e.g., via a designator embedded in the advertisement). Remote facility 80 will then relay this information to radio station 90 so that radio station 90 can, for example, attempt to collect a royalty payment from the business/service that produced the advertisement and/or from the ad server 88 that delivered the advertisement to vehicle 12 via the V2X communications channel 89. Skilled artists will also see that radio station 90 can use this information for other purposes such as, for example, to better determine the kinds of music and/or live events (e.g., political speeches, sports, etc.) that should be broadcasted by the station 90 in particular or the information can be used to develop statistics on listener demographics or the information itself can be sold to third party entities (e.g., other radio stations, music companies, etc.) or for some other reason. After optional step 250, method 200 moves to completion 202.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method to receive and deliver media content during a designated time slot, the method comprising:
   receiving, via a processor of a telematics unit of a vehicle, a continuous and substantially uninterrupted stream of a first type of media content over a first wireless communication channel, wherein the first type of media content is broadcast from a radio station;
   detecting, via the processor, the designated time slot in the first type of media content;
   receiving, via the processor, a second type of media content over a vehicle-to-everything (V2X) communication channel, wherein the second type of media content is received from an ad server installed on infrastructure located in proximity to a road segment, wherein the second type of media content is received by the processor when the vehicle is traveling along the road segment; and
   delivering during the designated time slot, via an audio system of the vehicle, the second type of media content to one or more vehicle passengers.

2. The method of claim 1, further comprising the step of modifying, via the processor, a length of time of the second type of media content to conform to the time parameters of the designated time slot.

3. The method of claim 1, further comprising the step of notifying, via the processor, a remote facility that the second type of media content has been delivered, wherein the remote facility will relay the notification information to the radio station so that the radio station can attempt to collect a royalty payment from a business or service that produced the second type of media content.

4. The method of claim 1, further comprising the step of filtering, via the processor, the second type of media content that can be received based on one or more user preferences, user feedback, vehicle location, direction of vehicle travel, or some combination thereof.

5. The method of claim 1, wherein the processor receives a plurality of versions of the second type of media content over the V2X communication channel, wherein the particular content of the plurality of versions of the second type of media content is substantially similar, wherein each version of the plurality of versions the second type of media content has a unique time duration.

6. The method of claim 1, wherein:
   the first wireless communication channel is an amplitude modulated (AM) radio channel, frequency modulated (FM) radio channel, Real-time Streaming Protocol (RTSP) radio channel, or satellite radio channel.

7. The method of claim 1, wherein the first and second type of media content include one or more audio and/or visual advertisements.

8. A system to receive and deliver media content during a designated time slot, the system comprising:
   a memory configured to comprise one or more executable instructions and a processor configured to execute the executable instructions, wherein the memory and processor are located in a telematics unit of a vehicle, wherein the executable instructions enable the processor to:
   receive a continuous and substantially uninterrupted stream of a first type of media content over a first wireless communication channel, wherein the first type of media content is broadcast from a radio station;
   detect the designated time slot in the first type of media content;
   receive a second type of media content over a vehicle-to-everything (V2X) communication channel, wherein the second type of media content is received from an ad server installed on infrastructure located in proximity to a road segment, wherein the second type of media content is received by the telematics unit when the vehicle is traveling along the road segment; and
   deliver, via an audio system of the vehicle, during the designated time slot, the second type of media content to one or more vehicle passengers.

9. The system of claim 8, wherein the executable instructions further enable the processor to: modify a length of time of the second type of media content to conform to the time parameters of the designated time slot.

10. The system of claim 8, wherein the executable instructions further enable the processor to: notify a remote facility that the second type of media content has been delivered, wherein the remote facility will relay the notification information to the radio station so that the radio station can attempt to collect a royalty payment from a business or service that produced the second type of media content.

11. The system of claim 8, wherein the executable instructions further enable the processor to: filter the second type of media content that can be received based on one or more user preferences, user feedback, vehicle location, direction of vehicle travel, or some combination thereof.

12. The system of claim 8, wherein the processor receives a plurality of versions of the second type of media content over the V2X communication channel, wherein the particular content of the plurality of versions of the second type of media content is substantially similar, wherein each version of the plurality of versions the second type of media content has a unique time duration.

13. The system of claim 8, wherein:
   the first wireless communication channel is an amplitude modulated (AM) radio channel, frequency modulated (FM) radio channel, Real-time Streaming Protocol (RTSP) radio channel, or satellite radio channel.

14. The system of claim 8, wherein the first and second type of media content include one or more audio and/or visual advertisements.

15. A non-transitory and machine-readable medium having stored thereon executable instructions adapted to receive and deliver media content during a designated time slot, which when provided to a processor of a telematics unit of a vehicle and executed thereby, causes the processor to:
- receive a continuous and substantially uninterrupted stream of a first type of media content over a first wireless communication channel, wherein the first type of media content is broadcast from a radio station;
- detect the designated time slot in the first type of media content;
- receive a second type of media content over a vehicle-to-everything (V2X) communication channel, wherein the second type of media content is received from an ad server installed on infrastructure located in proximity to a road segment, wherein the second type of media content is received by the telematics unit when the vehicle is traveling along the road segment; and
- deliver, via an audio system of the vehicle, during the designated time slot, the second type of media content to one or more vehicle passengers.

16. The non-transitory and machine-readable memory of claim 15, wherein the executable instructions further enable the processor to: modify a length of time of the second type of media content to conform to the time parameters of the designated time slot.

17. The non-transitory and machine-readable memory of claim 15, wherein the executable instructions further enable the processor to: notify a remote facility that the second type of media content has been delivered, wherein the remote facility will relay the notification information to the radio station so that the radio station can attempt to collect a royalty payment from a business or service that produced the second type of media content.

18. The non-transitory and machine-readable memory of claim 15, wherein the executable instructions further enable the processor: filter the second type of media content that can be received based on one or more user preferences, user feedback, vehicle location, direction of vehicle travel, or some combination thereof.

19. The non-transitory and machine-readable memory of claim 15, wherein the processor receives a plurality of versions of V2X communication channel, wherein the particular content of the plurality of versions of the second type of media content is substantially similar, wherein each version of the plurality of versions the second type of media content has a unique time duration.

20. The non-transitory and machine-readable memory of claim 15, wherein:
- the first wireless communication channel is an amplitude modulated (AM) radio channel, frequency modulated (FM) radio channel, Real-time Streaming Protocol (RTSP) radio channel, or satellite radio channel.

* * * * *